(12) United States Patent
Thybo et al.

(10) Patent No.: US 11,953,907 B2
(45) Date of Patent: Apr. 9, 2024

(54) AUTONOMOUS SURFACE TREATMENT VEHICLE WITH FAST WALL MODE

(71) Applicant: Nilfisk A/S, Broendby (DK)

(72) Inventors: Claus Thybo, Abyhoj (DK); Rasmus Pedersen, Norresundby (DK)

(73) Assignee: Nilfisk A/S, Copenhagen (DK)

( * ) Notice: Subject to any disclaimer, the term of this patent is extended or adjusted under 35 U.S.C. 154(b) by 630 days.

(21) Appl. No.: 17/270,707

(22) PCT Filed: Aug. 27, 2019

(86) PCT No.: PCT/EP2019/072742
§ 371 (c)(1),
(2) Date: Feb. 23, 2021

(87) PCT Pub. No.: WO2020/043676
PCT Pub. Date: Mar. 5, 2020

(65) Prior Publication Data
US 2022/0197293 A1 Jun. 23, 2022

(30) Foreign Application Priority Data
Aug. 28, 2018 (EP) .................................... 18191058

(51) Int. Cl.
*G05D 1/02* (2020.01)
*G05D 1/00* (2006.01)
(52) U.S. Cl.
CPC .......... *G05D 1/0214* (2013.01); *G05D 1/0061* (2013.01); *G05D 1/0223* (2013.01); *G05D 1/024* (2013.01); *G05D 1/0274* (2013.01)
(58) Field of Classification Search
CPC .. G05D 1/0214; G05D 1/0061; G05D 1/0223; G05D 1/024; G05D 1/0274; G05D 2201/0203
See application file for complete search history.

(56) References Cited

U.S. PATENT DOCUMENTS 7,995,192 B2    8/2011   Wustefeld
8,874,300 B2   10/2014   Allard et al.
(Continued)

FOREIGN PATENT DOCUMENTS

DE        10240227 A1    3/2004
DE     102013113426 A1    6/2014
(Continued)

OTHER PUBLICATIONS

DE-102018114892-B4 with English translation; filed Jun. 20, 2018; published Nov. 9, 2023. (Year: 2018).*
(Continued)

*Primary Examiner* — Calvin Cheung
(74) *Attorney, Agent, or Firm* — Kinney & Lange, P.A.

(57) ABSTRACT

The invention provides an autonomous surface treatment vehicle, e.g. a floor cleaner, with an autonomy system navigating according to a map, a scanning sensor to detect a position of an obstacle within a scanning zone and generate a detection signal. A safety system is arranged to generate a safety stop in case the detection signal indicates an obstacle within a safety zone. The safety system can enter a special mode of operation, e.g. upon request from the autonomy system, where a special safety zone selection algorithm selects the safety zone e.g. from a special set of predetermined safety zones. Especially, such special mode can provide safety zones with a relaxed speed limit in combination with a restricted direction limit, so as to provide a faster driving near a wall or similar known obstacle.

20 Claims, 4 Drawing Sheets

(56) References Cited

U.S. PATENT DOCUMENTS

2009/0043440 A1    2/2009  Matsukawa et al.
2009/0322549 A1   12/2009  Schleifer et al.
2017/0049288 A1*   2/2017  Knutson ............. A47L 11/4083

FOREIGN PATENT DOCUMENTS

| DE | 102014106975 A1 | 11/2015 |
|----|-----------------|---------|
| EP | 2101193 B2      | 5/2012  |
| EP | 2428862 B1      | 1/2013  |
| EP | 2952928 A1      | 12/2015 |
| EP | 3223098 A1      | 9/2017  |
| KR | 1020110127946 A | 11/2011 |
| WO | WO2011141629 A1 | 11/2011 |
| WO | WO2013130734 A1 | 9/2013  |

OTHER PUBLICATIONS

WO 2018112495 A2 with English translation; filed Dec. 22, 2017; published Jun. 28, 2018. (Year: 2017).*
Communication pursuant to Rule 114(2) EPC from EP Application No. 16837867.7, dated Jun. 7, 2021, 5 Pages.
Extended European Search Report for EP Application No. 18191058.9, dated Mar. 6, 2019, 4 pages.
International Search Report and Written Opinion from PCT Application Serial No. PCT/EP2019/072742, dated Nov. 4, 2019, 12 pages.
S.D. Pendleton, et al., "Perception, Planning, Control, and Coordination for Autonomous Vehicles" from Machines 2017, 54 pages <https://www.mdpi.com/2075-1702/5/1/6>.

* cited by examiner

AUTONOMOUS SURFACE TREATMENT VEHICLE WITH FAST WALL MODE

FIELD OF THE INVENTION

The present invention relates to the field of autonomous vehicles, specifically to the field of autonomous surface treatment vehicles, such as self driven floor cleaning devices etc. More specifically, the invention provides an autonomous surface treatment vehicle with a safety system allowing e.g. a special wall mode of operation, e.g. allowing increased speed at a given distance to the wall, or shorter distance to the wall at a given speed.

BACKGROUND OF THE INVENTION

An autonomous vehicle typically has both an autonomy system for controlling navigation and a safety system. The objective of the autonomy system is to enable the vehicle to move around in an environment. The navigation system is often implemented with a SLAM (Simultaneous Localization and Mapping) function that is capable of both generating a map of the surroundings and using the generated map to move accurately and precisely around the mapped area. The function of the safety system is to ensure the vehicle does not cause harm to people, neither directly nor indirectly. Dependent on the type and application of the autonomous machine, the safety system can include protection against surface drop-off, e.g. stairs, ledges or the like, and a proximity protection against bumping into obstacles, e.g. a person or other object. Especially, the autonomous vehicle must comply with relevant safety operation standards in order to be certified for operation.

The proximity protection part of the safety implements different safety zones, wherein each safety zone is an area selected by the safety system based on the vehicle speed and direction. Any object or person within a safety zone will cause the vehicle to come to a stop. Safety zones are designed of a size and shape to prevent vehicle collision. A challenge and optimization problem for the proximity protection part of the safety system is to react quickly and stop when a person or other object enters the safety zone. In the worst-case scenario of maximum direction and speed change, this puts limits to e.g. driving at a short distance along a wall. Here, the worst-case safety zone can only be expressed by a balance between a slow speed and a reasonable driving distance to the wall. This can lead to a poor efficiency, e.g. for an autonomous cleaning machine to clean the floor at a short distance to a long wall.

As the safety system design needs to be documented and certified reliable and resilient to faults, a common design approach is to separate the safety design from the functional part of the autonomy system. This separation of concerns reduces the complexity of the safety system, and thereby also the complexity of the safety certification. In addition, it reduces the need for recertification when elements of the functional safety—that potentially can impact the safety system—is modified.

The size of the safety zone for a given operational speed is impacted by the latency in reacting and the de-acceleration, but especially the change of direction and speed during the latency period.

As the autonomy system is, for above reasons, not included in the safety certification, a worst-case consideration will include the most unfavourable operation in the latency period, even when this is unlikely. E.g. this leads to safety zones allowing only a very low speed under special conditions, such as when driving near a wall.

In practice, such safety zone concept is often implemented as selection of pre-stored sets of safety zones calculated based on the characteristics of the vehicle with respect to acceleration/deceleration and direction change capabilities in the latency period. In response to a given speed and direction of the vehicle, the safety system select the corresponding safety zone, e.g. having often the shape of a wedge around the vehicle.

SUMMARY OF THE INVENTION

Thus, according to the above description, it may be seen as an object of the present invention to provide an autonomous mobile vehicle for treating floors, e.g. a floor washer, a floor sweeper, a floor stripping device or the like, with increased efficiency in floor treatment under various operating conditions and still complying with safety operation standards.

In a first aspect, the invention provides an autonomous mobile surface treatment vehicle for driving on a surface, the surface treatment vehicle comprising
 an autonomy system arranged to output speed and direction control signals for navigating the surface treatment vehicle according to a map or planned route,
 a sensor system arranged to sense speed and direction of the surface treatment vehicle and to output speed and direction estimate signals accordingly, the sensor system further comprising a scanning sensor arranged to scan a scan area around the surface treatment vehicle for determining a position of an obstacle within the scan area and to generate a detection signal accordingly,
 a safety system arranged to receive the speed and direction estimate signals and to select a safety zone relative to the surface treatment vehicle accordingly in response to a safety zone selection algorithm, such as an algorithm selecting between off line calculated safety zones for predetermined "wedges", and wherein the safety system is arranged to receive the detection signal, and to generate a safety stop signal in case the detection signal indicates an obstacle within the safety zone,
 a controllable propulsion motor or motors for controlling drive speed of the surface treatment vehicle,
 a controllable steering mechanism for controlling drive direction of the surface treatment vehicle, and
 a controller arranged to receive speed and direction control signals, and to control the propulsion motor or motors and the steering mechanism for driving the surface treatment vehicle at speed and direction in response to the speed and direction control signals, wherein the controller is further arranged to control the propulsion motor or motors and/or a brake to bring the surface treatment vehicle to safety stop, e.g. an emergency stop, in case a safety stop signal is received,
 wherein the safety system is arranged to switch from a first mode of operation where a first safety zone selection algorithm is executed as the safety zone selection algorithm from a first safety zone selection algorithm to a second mode of operation, where a second safety zone selection algorithm is executed as the safety zone selection algorithm, and wherein the first and second safety zone selection algorithms select the safety zone in different ways, such as with a different balance between limits for speed and direction changes.

Such surface treatment vehicle is advantageous, since the special mode of operation can be used for operating conditions that require special attention. E.g. the first mode of operation can be a "normal" or default mode of operation which is known from the prior art based on safety zones reflecting the worst case requirements. The second mode of operation can be a "special" mode of operation which may be requested by the autonomy system when entering special conditions where the another way of selecting safety zone can be advantageous. In embodiments such special mode of operation can be a fast wall mode, where the safety system can assign a special set of pre-calculated safety zone with increased speed but under restriction of a direction which is set to be below the maximum possible direction change in the latency period, i.e. different from the worst case scenario.

In the use case of e.g. an autonomous cleaning vehicle, this can allow either faster driving at a given distance to a wall, or allowing cleaning closer to the wall at a reasonable speed. In other words, such special mode of operation allows another balance between direction and speed limits, and thus the autonomy system can be programmed so request such special mode, when e.g. approaching a wall. This can be utilized by the autonomy system, which can request such wall mode, e.g. when the autonomy system has a planned route approaching a long distance near a wall. At the end of such driving near a wall, approaching a turn, the autonomy system can request to leave the wall mode which would otherwise cause a safety stop due to the necessary direction change for making a turn. Thus, the invention offers the autonomy system the possibility of requesting a special contract with the safety system regarding speed and direction limits different from the normal worst case mode of operation. This can be advantageous in a given situation, where the autonomy system has a planned route with known special requirements, e.g. driving near a wall etc.

In some embodiment, the safety system electronics from known autonomous vehicles can be reused, only requiring a reprogramming and an electric wired or wireless input to receive an electric request signal from the autonomy system.

Also, there is a need to implement a dedicated library of pre-stored safety zones to be selected from in the second mode of operation. In some embodiments, a recertification of the safety system can be required.

It is appreciated that the invention can be implemented on any type of autonomous surface treating vehicle, such as self driven floor cleaning machines of different size and propulsion system. Especially, the invention is advantageous for large and heavy vehicles designed for high speed driving, since these machines are bound by safety requirements, e.g. CSA 336 covering autonomous battery powered cleaning machines.

By 'surface treatment vehicle' is understood a vehicle comprising equipment capable of performing a treatment of the surface over or on which the vehicles moves. Such treatment may especially comprise cleaning and/or mechanical cleaning of the surface. By cleaning is understood at least cleaning by suction, washing, scrubbing, sweeping, drying, disinfection or otherwise cleaning, discovering, sensing, handling, picking up, removing, disinfecting or clearing away any dust, dirt, debris, particles, liquids, fluids, bacteria or any other substance from the air (or any other gas), water (or any other liquid), or any natural or man-made surface) by any means of manual, electronic, intelligent, autonomous and/or connected cleaning solutions. Further, by mechanical cleaning is understood at least mechanical cleaning by the processes of scrubbing, polishing, washing and/or sweeping surfaces, using suction power to pick up debris and/or liquids from the surface etc.

By a 'safety zone' is understood an area selected by the safety system based on the vehicle speed and direction. Any object or person within a safety zone will cause the vehicle to come to a stop. Safety zones are designed of a size and shape to prevent vehicle collision.

In the following, preferred embodiments and features will be described.

The first mode of operation may especially be a normal or default mode of operation, wherein the first safety zone selection algorithm selects safety zone to fulfil worst case requirements during the latency period for a full stop operation, and wherein the second mode of operation is a special mode of operation which can be selected for special operating conditions, where restrictions on possible change of speed and/or direction during the latency period can be guaranteed to be avoided.

In preferred embodiments, the autonomy system is arranged to send a request signal to the safety system to request said switch from the first to the second mode of operation. It is to be understood that switching to the second mode of operation can alternatively be initiated by other means, e.g. manually by a user.

In a preferred embodiment, the second safety zone selection algorithm is arranged to select the safety zone from a set of pre-stored safety zones where direction is limited compared to a maximum direction change possible by the steering mechanism, hereby allowing e.g. a fast wall mode of operation, since the possible direction change has been limited compared to the worst-case scenario of full left or right direction change in the latency period. Either a symmetric or an asymmetric safety zone can be selected in such wall mode, i.e. where maximum allowable direction change is symmetric or asymmetric, e.g. around a direction straight ahead. Likewise, it is to be understood that the asymmetric safety zones could be defined in relation to any driving direction, e.g. straight backwards, in case the vehicle is capable of driving backwards. Especially, the second safety zone selection algorithm may be arranged to select a safety zone which allows a higher speed under the restriction of a more narrow direction angle, compared to a safety zone selected by the first safety zone selection algorithm. Specifically, said restriction of a more narrow direction angle is to be determined for the vehicle in question, but in general it is preferred that the narrow direction angle is selected so as to accommodate small direction corrections needed for the vehicle to follow a straight direction without conflicting with the safety zone, which would otherwise cause a safety stop.

For an autonomous floor cleaning vehicle, or the like, the increased speed near a wall can increase efficiency significantly, e.g. when operating in smaller rooms or in narrow rooms, such as a hotel corridor, where the worst-case safety zone will allow only a very limited speed in average.

In one embodiment, the speed and direction control signals output by the autonomy system are applied to the safety system, and wherein the safety system is arranged to, when being in the second mode of operation:
  to compare the speed and direction control signals with a maximum speed and a maximum direction given in the safety zone, and
    in case the speed and direction control signals conflict with the maximum speed and maximum direction given in the safety zone, to output limited speed and direction control signals to the controller which comply with the safety zone or to skip to output speed and direction control signals conflicting with the safety zone or to generate a safety stop signal, and in case the speed and direction control signals do not conflict with the maximum speed and maximum direction given in the safety zone, to output speed and direction control signals corresponding to speed and direction values in the received speed and direction control signals received by the autonomy system.

In this embodiment, the speed and direction control signals from the autonomy system are routed via the safety system, which then filters the speed and direction values and outputs only valid speed and direction signals complying with the special safety zone selected, or alternatively simply skips sending speed and direction signals with values which do not comply with the safety zone requirements.

In this embodiment, it may be preferred to send a safety stop signal to the controller, in case the speed and direction control signals from the autonomy system conflict with the safety zone, and/or to send a signal to the autonomy signal to inform about the conflict. A still further option for the safety system is to automatically switch back to the first mode of operation, in case speed and direction control signals from the autonomy system conflict with the safety zone requirements. It is to be understood, that in this embodiment, it is the responsibility of the autonomy system to handle the second mode of operation by complying with the special speed and direction restrictions of the safety zones selected in the second mode of operation.

In another embodiment, the speed and direction control signals output by the autonomy system are applied to the safety system, and wherein the safety system is arranged to, when being in the special mode of operation:

to compare the speed and direction control signals with the maximum speed and maximum direction given in the safety zone, and in case the speed and control signals conflict with the maximum speed and maximum direction given in the safety zone, to generate a safety stop signal.

Thus, in this embodiment, the safety system simply monitors the speed and direction control signals from the autonomy system.

In general, the autonomy system should have pre-stored information regarding the second possibly more modes of operations, so that once requested, the autonomy system knows the speed and direction limit requirements valid for safety zones selected in these modes of operation. If the autonomy system does not send speed and direction control signals complying with the requirements in the second mode of operation, the safety system will preferably be programmed to generate a safety stop signal.

In yet another embodiment, the safety system is arranged to, when being in the second mode of operation:

to allow the second safety zone selection algorithm to select an asymmetric safety zone, so as to allow the cleaning vehicle to follow a predetermined curved trajectory, such as a safety zone with a given different value of maximum left and maximum right direction.

Thus, compared to following e.g. a straight wall, the autonomy can request a curved trajectory mode of operation, e.g. where the autonomy system requests a special safety zone suited for following a direction with a fixed curve. Especially, the safety system may be arranged to receive data indicative of a planned trajectory from the autonomy system, and when being in the special mode of operation:

to select the asymmetric safety zone in accordance with the planned trajectory, to compare the speed and direction control signals with maximum speed and maximum direction given in the asymmetric safety zone, and in case the speed and direction control signals conflict with the maximum speed and maximum direction given in the safety zone to generate a warning signal to the autonomy system, or to generate a safety stop signal.

This embodiment is advantageous e.g. when the autonomy system has a planned trajectory to follow, such as for following a curve with a fixed curvature. By trajectory is understood a path with given restrictions of maximum speed and maximum direction deviations over a period of time.

In embodiments where the autonomy system sends a request signal to the safety system for requesting a switch to the second mode of operation, it may be preferred that the safety system is arranged to send an acknowledge signal to the autonomy system in response to the request signal, so as to communicate that the safety system is in the second mode of operation. Hereby, the autonomy system can take action accordingly, and send speed and direction control signals which do not violate the requirements in the second mode of operation.

The first safety zone selection algorithm and the second safety zone selection algorithm may be arranged to select a safety zone from two separate sets of pre-stored safety zones. E.g. the separate sets of pre-stored safety zones are pre-calculated sets of safety zones based on emergency stop time data for the specific surface treatment vehicle. Thus, the first and second safety zone sets can be off-line calculated and stored as separate tabulated data sets.

Preferably, the autonomy system and the safety system are constituted by separate electronic circuits e.g. with separate programmable processors. The autonomy system may be arranged to send the request signal to request a special mode of operation to the safety system via a wired electrical connection or via a wireless radio frequency signal. Hereby, the safety system can be implemented by known components, and the separation allows verification of the safety procedures without the autonomy need for verification in case the autonomy system is changed.

In some embodiments, the safety system is arranged to switch the safety zone selection algorithm between the first, the second and one or more safety zone selection algorithms. Thus, e.g. a fast wall mode, a very-near wall mode, and a trajectory mode of operation can be selected. If preferred, more than two, such as 3-10 different modes may be selected each with a special set of pre-calculated and pre-stored safety zones. E.g. the specific safety zone selection algorithm can be requested by sending a request signal to the safety system indicating the specific safety zone selection algorithm. E.g. the autonomy system can be arranged to send such request signal to the safety system.

The sensor system may comprises a LIDAR scanner for scanning for obstacles. However, other sensor technologies may be used as well for this scanning.

Preferably, the surface treatment vehicle has a total mass of at least 50 kg, such as at least 70 kg, such as at least 200 kg, such as at least 600 kg, or even above 600 kg. Such rather large vehicles are capable of providing significant harm in case of impact, and thus especially for these vehicles, the invention is advantageous.

Preferably, the surface treatment vehicle has a maximum speed of at least 3 km/h, such as at least 6 km/h, such as at least 8 km/h, such as at least 10 km/h, such as at least 15 km/h.

Especially, the invention is advantageous for vehicles covered by safety standard CSA/ANSI C22.2 No. 336-17 covering particular requirements for rechargeable battery-operated commercial robotic floor treatment machines with traction drives. The machines covered in this Standard are intended for floors with an artificial surface and used for the following applications: sweeping; scrubbing; wet or dry pickup; polishing;
application of wax, sealing products, and powder-based detergents; or shampooing.

In a preferred embodiment, the surface treatment vehicle is a cleaning vehicle, such as covered by safety standard CSA/ANSI C22.2 No. 336-17. Preferably, the cleaning vehicle comprises one or more cleaning mechanisms with a function selected from: sweeping; scrubbing; wet or dry pickup; polishing; application of wax, sealing products, and powder-based detergents; and shampooing. Especially, such mechanism may comprise a sweeping mechanism, a suction mechanism, a liquid spraying system, a polishing tool, and a rotating brush, or a combination of two or more of these.

In another embodiment, the surface treatment vehicle is an autonomous floor stripping machine, i.e. a surface treatment vehicle comprising in this embodiment a floor stripping mechanism.

It is to be understood that the invention can be implemented on vehicles with any type of steering mechanisms for determining drive direction. In some embodiments, the steering mechanism comprising an actuator being arranged to control an angle of a steering wheel in response to the direction control signal.

Thus, one or more wheels can be controlled with respect to direction change of the vehicle. In other embodiments, the propulsion motor(s) is arranged to drive at least two wheels at different positions on the vehicle, and wherein the steering mechanism comprises a controller for controlling speed of the at least two wheels in response to the direction control signal, e.g. via a differential mechanism which implements the steering function.

The surface treatment vehicle may have an on-board battery for powering the propulsion motor or motors and preferably also other electric power demanding circuits of the vehicle. The propulsion motor or motors may provide traction to one or more wheels.

In some embodiments, a LIDAR scanner may be more or less completely integrated with the safety system, i.e. forming a separate component for mounting on the surface treatment vehicle.

In a second aspect, the invention provides a method for operating an autonomous surface treatment vehicle comprising an autonomy system for navigating the surface treatment vehicle, further comprising a safety system arranged to provide a safety stop in response to a detection signal from a scanning sensor, the method comprising
  switching from a first safety zone selection algorithm to a second safety zone selection algorithm which selects a safety zone in a different way than the normal safety zone algorithm,
  selecting a safety zone by the second safety zone selection algorithm,
  outputting speed and direction control signals from the autonomy system in accordance with a map or planned route,
  controlling speed and direction of the surface treatment vehicle in response to the speed and direction control signals, and
  operating the safety system according to the safety zone selected by the special safety zone selection algorithm.

In a third aspect, the invention provides a computer executable program code, or a programmable- or fixed hardware, and/or combination hereof, arranged to perform the method according to the second aspect, when executed on a processor or processors of an autonomy system and a safety system. The computer executable program code may be stored on a data carrier and/or be available for downloading on the internet, or be implemented in an electronic chip.

It is appreciated that the same advantages and embodiments described for the first aspect apply as well for the further aspects. Further, it is appreciated that the described embodiments can be intermixed in any way between all the mentioned aspects.

BRIEF DESCRIPTION OF THE FIGURES

The invention will now be described in more detail with regard to the accompanying figures of which

The figures illustrate specific ways of implementing the present invention and are not to be construed as being limiting to other possible embodiments falling within the scope of the attached claim set.

DETAILED DESCRIPTION OF THE INVENTION

The embodiments to be described in the following are based on a safety system with a "normal" mode of operation selecting safety zones on a worst case basis, i.e. safety zones determined based on maximum possible changes in speed and direction during the latency period, as described in the foregoing. The "special" mode of operation can be selected on request by the autonomy system, where the autonomy system accepts special restrictions to speed and direction to be obeyed, if a safety stop should be avoided. This in return can provide selection of safety zones allowing e.g. a higher speed in certain operating conditions, under the special restrictions set by the safety system, e.g. a "near wall mode".

Figure 1:
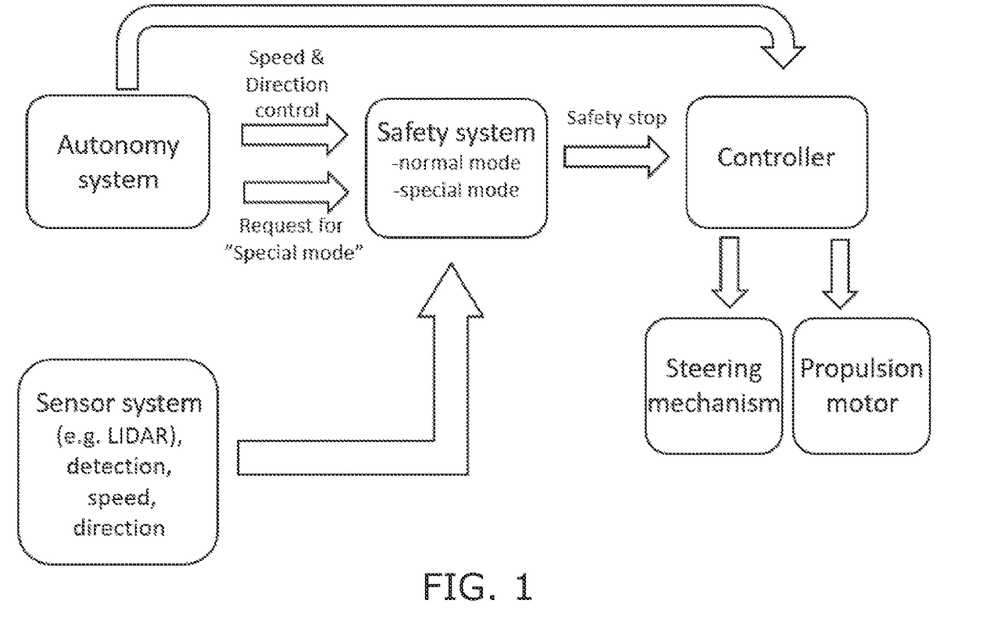
FIG. 1 illustrates a block diagram of one embodiment.

FIG. 1 illustrates a simple embodiment of an autonomous self driven floor treatment vehicle, e.g. a floor cleaning vehicle of 70 kg or larger. An autonomy system outputs speed and direction control signals for navigating the vehicle according to a map or planned route, e.g. a map previously determined based on a scanning or other information of the room to be cleaned, or a route to be planned on the fly. The vehicle preferably has a battery for powering an electric propulsion motor or motors for driving one or more wheels directly or via a gear box. One or more wheels are involved in the functional steering of the vehicle.

A sensor system is arranged to sense speed and direction of the vehicle, and to output speed and direction estimate signals accordingly. Further, the sensor system further comprising a scanning sensor arranged to scan a scan area around the vehicle for determining a position of an obstacle, e.g. a person, within the scan area and to generate a detection signal accordingly. The detection signal preferably comprises position data for detected obstacles, e.g. coordinate data.

A safety system is arranged to receive the speed and direction estimate signals and to select a safety zone relative to the surface treatment vehicle accordingly in response to a safety zone selection algorithm. The safety system further receives the detection signal, e.g. including position data, and generates a safety stop signal in case the detection signal indicates an obstacle within the safety zone.

A controller receives the speed and direction control signals, and control an electric propulsion motor or motors and a steering mechanism for driving the surface treatment vehicle at speed and direction in response to the speed and direction control signals. The controller is further arranged to control the propulsion motor or motors and/or a brake to bring the vehicle to a safety stop (e.g. an emergency stop) in case a safety stop signal is received.

The autonomy system can send a request signal to request a special mode of operation to the safety system different from the default mode of operation. The safety system then switches the safety zone selection algorithm from a normal safety zone selection algorithm to a special safety zone selection algorithm which selects the safety zone in a different way than the normal safety zone selection algorithm. Especially, this special mode can be a fast wall mode, where a higher speed than normal is allowed under the restriction of a more narrow range of directions. This allows high speed driving along a wall, and this mode can be requested where the autonomy system knows from the map, that driving along a (straight) wall is next on the planned route.

In this embodiment, the speed and direction control signals output by the autonomy system are applied to the safety system. When being in the special mode of operation, the safety system compares the speed and direction control signals with the maximum speed and maximum direction given in the safety zone. In case the speed and control signals conflict with the maximum speed and maximum direction given in the safety zone, then the safety system generates a safety stop signal to the controller to stop the vehicle.

This embodiment is a rather passive one, but still allows the special mode of operation. If preferred, the safety system can send an acknowledge signal to inform the autonomy system that the requested special mode has been entered.

Either the autonomy system or the safety system can switch back to the normal safety zone selection algorithm.

The safety zone selection algorithm can be a simple selection between a number of pre-calculated and pre-stored safety zones, one normal set corresponding to worst case direction and speed changes in the latency period, and one set for the special mode. In case of a fast wall mode, the special mode set has a narrow symmetric or asymmetric direction limit e.g. allowing only a minimum direction changes required for driving the vehicle straight ahead, while a higher speed than the normal mode is allowed.

Figure 2:
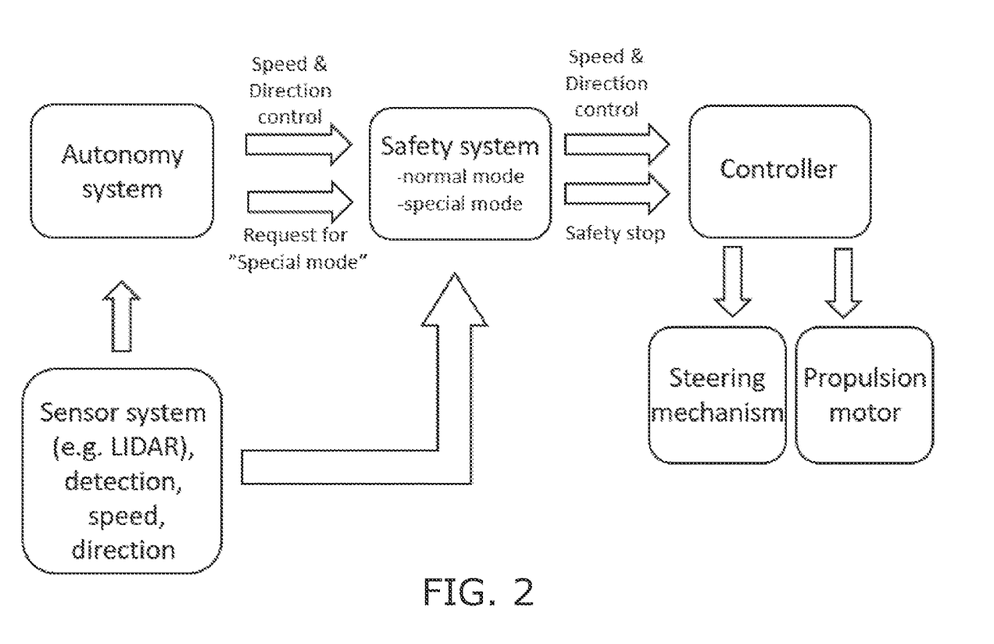
FIG. 2 illustrates a block diagram of another embodiment.

FIG. 2 shows another embodiment, where the speed and direction control signals output by the autonomy system are applied to the safety system and routed via the safety system to the controller. When being in the special mode of operation, the safety system compares the speed and direction control signals with a maximum speed and a maximum direction given in the safety zone. In case the speed and direction control signals conflict with the maximum speed and maximum direction given in the safety zone, then the safety system outputs limited speed and direction control signals to the controller which comply with the safety zone or to skip to output speed and direction control signals. In case the speed and direction control signals do not conflict with the maximum speed and maximum direction given in the safety zone, then the safety system simply outputs speed and direction control signals corresponding to speed and direction values in the received speed and direction control signals received by the autonomy system, in other words the safety system simply routes the speed and direction control signals though to the controller.

Figure 3:
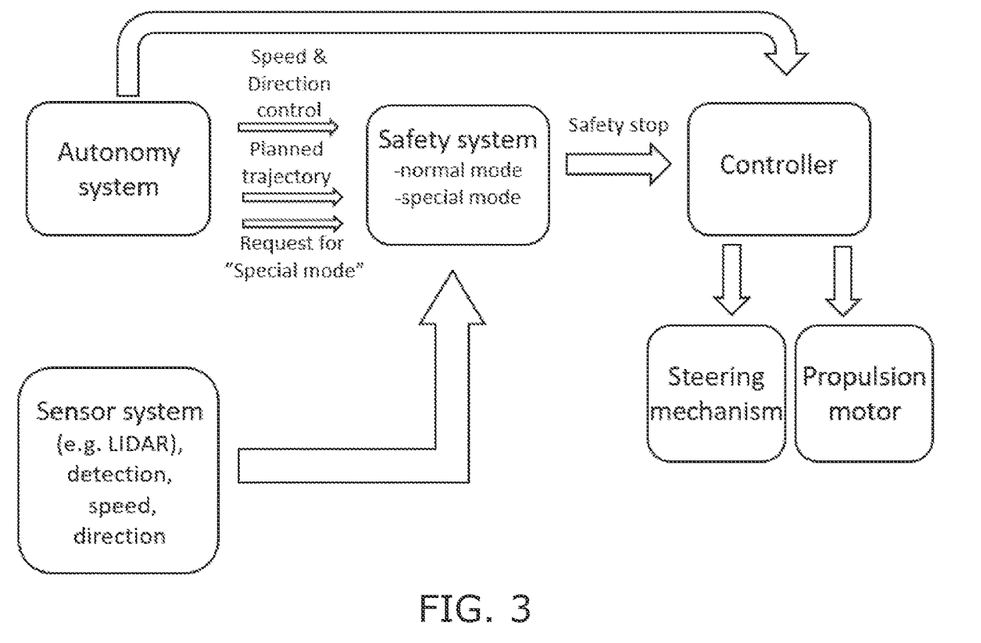
FIG. 3 illustrates a block diagram of yet another embodiment.

FIG. 3 shows yet another embodiment, where the autonomy system sends planned trajectory data to the safety system and requests a special curved trajectory mode of operation. Here, the safety system selects an asymmetric set of safety zones corresponding to the curve in the planned trajectory data. Thus, in this mode, the direction is asymmetrically restricted compared to the normal mode of operation, thereby corresponding to the planned curved trajectory to be followed by the vehicle.

Figure 4:
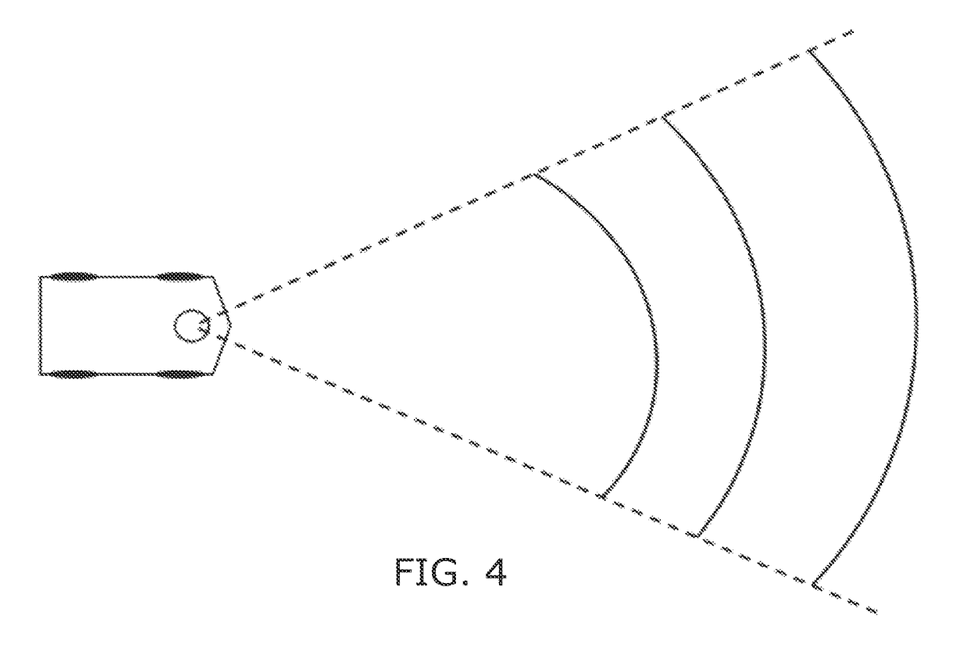
FIG. 4 illustrates the concept of safety zones.

FIG. 4 shows an example of safety zones in relation to a surface treatment vehicle, i.e. the restrictions on speed and direction. The dashed lines indicate direction restrictions and the solid arcs indicated zones corresponding to different speeds. The safety zones are calculated off-line taking into account the various delays involved in a safety stop procedure of the vehicle.

Figure 5:
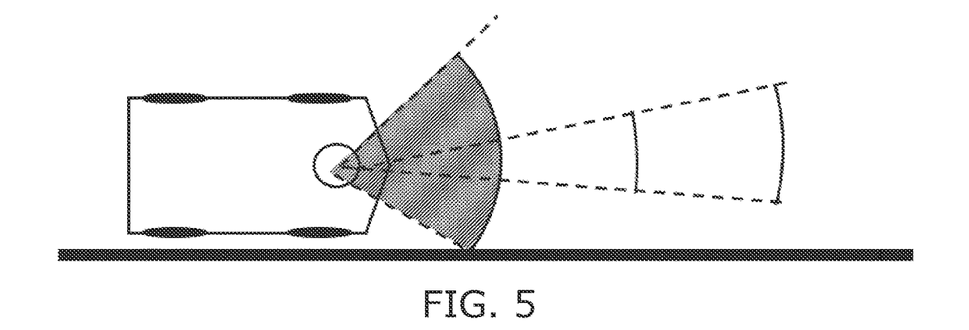
FIGS. 5 and 6 illustrate different safety zones for different implementations of a wall mode.

FIG. 5 illustrates the vehicle driving along a wall (bold solid line), and the difference between a normal mode safety zone (grey area), and a fast wall mode safety zone where the direction change limits are more strict, while the allowed speed is higher. In this example, the fast wall mode safety zone is still symmetric.

Figure 6:
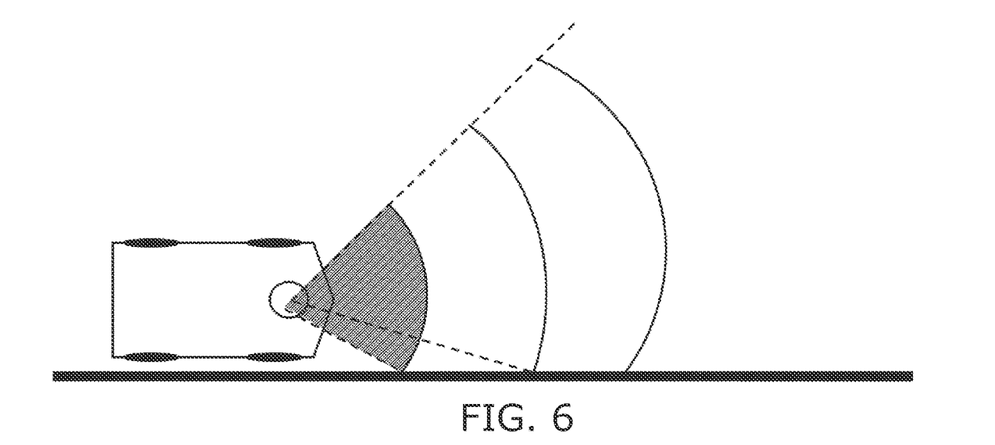

FIG. 6 illustrates another wall mode safety zone compared to (grey area), where the direction limit is asymmetric, since it is known that there is a wall to the right of the vehicle, thus changing direction to the right is limited, while changing direction to the left is less restricted.

Figure 7:
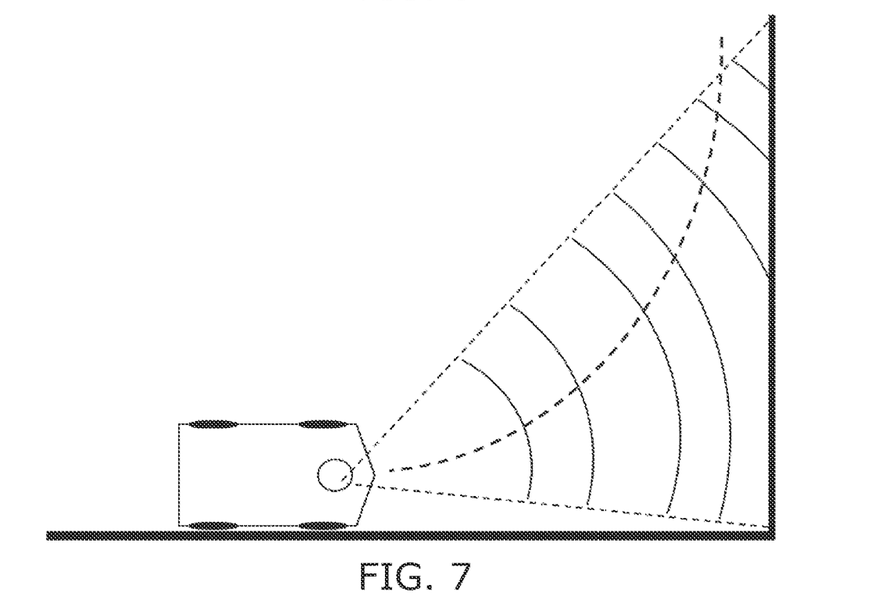
FIG. 7 illustrates safety zones in case of a curved trajectory mode of operation.

FIG. 7 shows an example of an asymmetric safety zone in an embodiment where the vehicle is planned to follow a curved trajectory (the curved dashed line), e.g. in the scenario where the vehicle is planned to turn left at the end of a room. As seen, the safety zone is asymmetric, thus allowing a higher speed in the curve compared to normal mode of operation, which would significantly reduce speed due to the presence of the two walls in the corner of the room.

Figure 8:
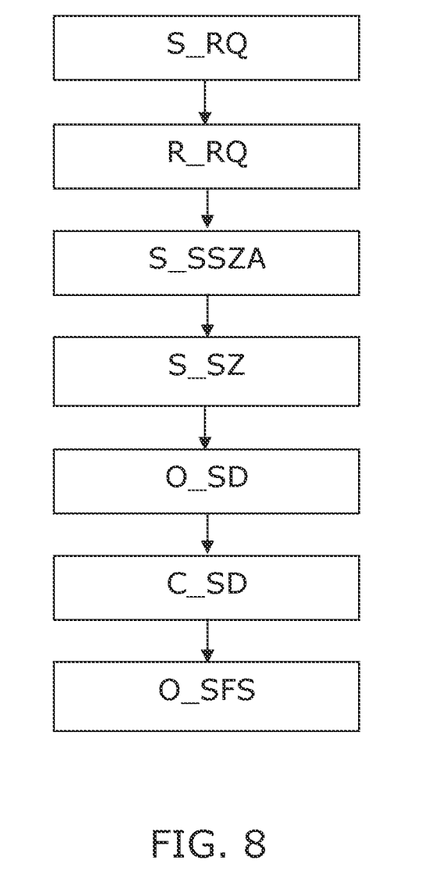
FIG. 8 illustrates steps of a method embodiment.

FIG. 8 illustrates step of a method embodiment of a surface treatment vehicle with an autonomy system for navigating the surface treatment vehicle, and a safety system arranged to provide a safety stop in response to a detection signal from a scanning sensor. The method comprising sending SRQ a request signal from an autonomy system to a safety system to request a special mode of operation, such as a fast wall mode. Next, receiving RRQ the request signal by the safety system. In response, the safety system comprises switching S_SSZA from a safety zone selection algorithm from a normal safety zone selection algorithm to a special safety zone selection algorithm which selects the safety zone in a different way than the normal safety zone selection algorithm, e.g. allowing a higher speed under the restriction of a more restricted direction. Next, selecting S_SZ a safety zone by the special safety zone selection algorithm. The, outputting O_SD speed and direction control signals from the autonomy system in accordance with a map or planned route, and controlling C_SD speed and direction of the surface treatment vehicle in response to the speed and direction control signals, and finally operating O_SFS the safety system according to the safety zone selected by the special safety zone selection algorithm.

This method may be implemented as software, i.e. program code, in the safety system and autonomy system.

To sum up: the invention provides an autonomous surface treatment vehicle, e.g. a floor cleaner, with an autonomy system navigating according to a map, a scanning sensor to detect a position of an obstacle within and generate a detection signal. A safety system is arranged to generate a safety stop in case the detection signal indicates an obstacle within a safety zone. The safety system can enter a special mode of operation, e.g. upon request from the autonomy system, where a special safety zone selection algorithm selects the safety zone e.g. from a special set of predetermined safety zones. Especially, such special mode can provide safety zones with a relaxed speed limit in combination with a restricted direction limit, so as to provide a faster driving near a wall or similar known obstacle.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An autonomous mobile surface treatment vehicle for driving on a surface, the surface treatment vehicle comprising:
    an autonomy system arranged to output speed and direction control signals for navigating the surface treatment vehicle according to a map or intended route;
    a sensor system arranged to sense speed and direction of the surface treatment vehicle and to output speed and direction estimate signals accordingly, the sensor system further comprising a scanning sensor arranged to scan a scan area around the surface treatment vehicle for determining a position of an obstacle within the scan area and to generate a detection signal accordingly;
    a safety system arranged to receive the speed and direction estimate signals and to select a safety zone relative to the surface treatment vehicle accordingly in response to a safety zone selection algorithm, and wherein the safety system is arranged to receive the detection signal, and to generate a safety stop signal in case the detection signal indicates an obstacle within the safety zone;
    a controllable propulsion motor or motors for controlling drive speed of the surface treatment vehicle;
    a controllable steering mechanism for controlling drive direction of the surface treatment vehicle; and
    a controller arranged to receive speed and direction control signals, and to control the propulsion motor or motors and the steering mechanism for driving the surface treatment vehicle at speed and direction in response to the speed and direction control signals, wherein the controller is further arranged to control the propulsion motor or motors and/or a brake to bring the surface treatment vehicle to a stop in case a safety stop signal is received,
    wherein the safety system is arranged to switch from a first mode of operation where a first safety zone selection algorithm is executed as the safety zone selection algorithm to a second mode of operation, where a second safety zone selection algorithm is executed, and wherein the first and second safety zone selection algorithms select the safety zone in different ways,
    wherein the safety system is arranged to switch the safety zone selection algorithm between the first, second and one or more additional safety zone selection algorithms.

2. The surface treatment vehicle of claim 1, wherein the autonomy system is arranged to send a request signal to the safety system to request said switch from the first to the second mode of operation.

3. The surface treatment vehicle of claim 2, wherein the safety system is arranged to send an acknowledge signal to the autonomy system in response to the request signal, to communicate that the safety system is in the second mode of operation.

4. The surface treatment vehicle of claim 1, wherein the second safety zone selection algorithm is arranged to select the safety zone from a set of safety zones where direction is limited compared to a maximum direction change possible by the steering mechanism.

5. The surface treatment vehicle of claim 1, wherein the speed and direction control signals output by the autonomy system are applied to the safety system, when being in the second mode of operation, and wherein the safety system is arranged to:
    compare the speed and direction control signals with a maximum speed and a maximum direction given in the safety zone;
    in case the speed and direction control signals conflict with the maximum speed and maximum direction given in the safety zone, to output limited speed and direction control signals to the controller which comply with the safety zone or to skip to output speed and direction control signals or to generate a safety stop signal; and
    in case the speed and direction control signals do not conflict with the maximum speed and maximum direction given in the safety zone, output speed and direction control signals corresponding to speed and direction values in the received speed and direction control signals received by the autonomy system.

6. The surface treatment vehicle of according to claim 5, wherein the safety system is arranged to send a signal to the autonomy system in cases where the safety system outputs limited speed and direction control signals to the controller or skips to output speed and direction control signals.

7. The surface treatment vehicle of claim 1, wherein the speed and direction control signals output by the autonomy system are applied to the safety system, and wherein the safety system, when being in the second mode of operation, is arranged to:
    to compare the speed and direction control signals with the maximum speed and maximum direction given in the safety zone; and in case the speed and control signals conflict with the maximum speed and maximum direction given in the safety zone, generate a safety stop signal.

8. The surface treatment vehicle of claim 1, wherein the safety system, when being in the second mode of operation, is arranged to:
to allow the second safety zone selection algorithm to select an asymmetric safety zone, to allow the cleaning vehicle to follow a predetermined curved trajectory, such as a safety zone with a given different value of maximum left and maximum right direction.

9. The surface treatment vehicle according to claim 8, wherein the safety system is arranged to receive data indicative of a planned trajectory from the autonomy system, and when being in the second mode of operation:
to select the asymmetric safety zone in accordance with the planned curved trajectory;
to compare the speed and direction control signals with maximum speed and maximum direction given in the asymmetric safety zone; and
in case the speed and direction control signals conflict with the maximum speed and maximum direction given in the safety zone to generate a warning signal to the autonomy system or to generate a safety stop signal.

10. The surface treatment vehicle of claim 1, wherein the second safety zone selection algorithm is arranged to select a safety zone which allows a higher speed under the restriction of a more narrow direction angle, compared to a safety zone selected by the first safety zone selection algorithm.

11. The surface treatment vehicle of claim 1, wherein the first safety zone selection algorithm and the second safety zone selection algorithm are arranged to select a safety zone from two separate sets of pre-stored safety zones.

12. The surface treatment vehicle of claim 1, wherein the autonomy system and the safety system are constituted by separate electronic circuits.

13. The surface treatment vehicle of claim 1, being a cleaning vehicle and comprising at least one cleaning mechanism with a function selected from the group consisting of: sweeping; scrubbing; wet or dry pickup; polishing; application of wax, sealing products, and powder-based detergents; and shampooing.

14. A method for operating an autonomous surface treatment vehicle that includes an autonomy system for navigating the surface treatment vehicle and a safety system arranged to provide a safety stop in response to a detection signal from a scanning sensor, the method comprising:
switching (S_SSZA) from a first safety zone selection algorithm to a second special safety zone selection algorithm which selects a safety zone in a different way than the first safety zone selection algorithm;
selecting (S_SZ) a safety zone by the second safety zone selection algorithm, wherein the second safety zone selection algorithm is arranged to select a safety zone which allows a higher speed under the restriction of a more narrow direction angle compared to a safety zone selected by the first safety zone selection algorithm;
outputting (O_SD) speed and direction control signals from the autonomy system in accordance with a map or planned route;
controlling (C_SD) speed and direction of the surface treatment vehicle in response to the speed and direction control signals; and
operating (O_SFS) the safety system according to the safety zone selected by the second safety zone selection algorithm.

15. An autonomous mobile surface treatment vehicle for driving on a surface, the surface treatment vehicle comprising:
an autonomy system arranged to output speed and direction control signals for navigating the surface treatment vehicle according to a map or intended route;
a sensor system arranged to sense speed and direction of the surface treatment vehicle and to output speed and direction estimate signals accordingly, the sensor system further comprising a scanning sensor arranged to scan a scan area around the surface treatment vehicle for determining a position of an obstacle within the scan area and to generate a detection signal accordingly;
a safety system arranged to receive the speed and direction estimate signals and to select a safety zone relative to the surface treatment vehicle accordingly in response to a safety zone selection algorithm, and wherein the safety system is arranged to receive the detection signal, and to generate a safety stop signal in case the detection signal indicates an obstacle within the safety zone;
a controllable propulsion motor or motors for controlling drive speed of the surface treatment vehicle;
a controllable steering mechanism for controlling drive direction of the surface treatment vehicle; and
a controller arranged to receive speed and direction control signals, and to control the propulsion motor or motors and the steering mechanism for driving the surface treatment vehicle at speed and direction in response to the speed and direction control signals, wherein the controller is further arranged to control the propulsion motor or motors and/or a brake to bring the surface treatment vehicle to a stop in case a safety stop signal is received,
wherein the safety system is arranged to switch from a first mode of operation where a first safety zone selection algorithm is executed as the safety zone selection algorithm to a second mode of operation, where a second safety zone selection algorithm is executed, and wherein the first and second safety zone selection algorithms select the safety zone in different ways;
the surface treatment vehicle being a cleaning vehicle and comprising at least one cleaning mechanism with a function selected from the group consisting of: sweeping; scrubbing; wet or dry pickup; polishing; application of wax, sealing products, and powder-based detergents; and shampooing.

16. The surface treatment vehicle of claim 15, wherein the second safety zone selection algorithm is arranged to select a safety zone which allows a higher speed under the restriction of a more narrow direction angle, compared to a safety zone selected by the first safety zone selection algorithm.

17. The surface treatment vehicle of claim 15, wherein the autonomy system is arranged to send a request signal to the safety system to request said switch from the first to the second mode of operation.

18. The surface treatment vehicle of claim 15, wherein the second safety zone selection algorithm is arranged to select the safety zone from a set of safety zones where direction is limited compared to a maximum direction change possible by the steering mechanism.

19. The surface treatment vehicle of claim 15, wherein the speed and direction control signals output by the autonomy system are applied to the safety system, when being in the second mode of operation, and wherein the safety system is arranged to:

compare the speed and direction control signals with a maximum speed and a maximum direction given in the safety zone;

in case the speed and direction control signals conflict with the maximum speed and maximum direction given in the safety zone, to output limited speed and direction control signals to the controller which comply with the safety zone or to skip to output speed and direction control signals or to generate a safety stop signal; and in case the speed and direction control signals do not conflict with the maximum speed and maximum direction given in the safety zone, output speed and direction control signals corresponding to speed and direction values in the received speed and direction control signals received by the autonomy system.

20. The surface treatment vehicle of claim 19, wherein the safety system is arranged to send a signal to the autonomy system in cases where the safety system outputs limited speed and direction control signals to the controller or skips to output speed and direction control signals.

\* \* \* \* \*